United States Patent [19]

Espiard et al.

[11] Patent Number: 5,872,155
[45] Date of Patent: Feb. 16, 1999

[54] LATEX BASED ON VINYL CHLORIDE COPOLYMERS WITH A SPECIFIC STRUCTURE, PROCESS FOR THE MANUFACTURE THEREOF AND APPLICATIONS THEREOF

[75] Inventors: Philippe Espiard, Liancourt; Richard Peres, Saint Auban Sur Durance; Benoit Ernst, Beaumont-Le-Rocher, all of France

[73] Assignee: Elf Atochem S.A., Puteaux, France

[21] Appl. No.: 866,053

[22] Filed: May 30, 1997

[30] Foreign Application Priority Data

May 31, 1996 [FR] France .................................. 96 06733

[51] Int. Cl.⁶ ....................................................... C08F 2/16
[52] U.S. Cl. ................................. 521/51; 521/64; 521/65; 521/70; 521/73; 521/75; 521/134; 521/138; 521/149; 523/201; 524/804; 524/832; 524/834; 524/845; 525/301; 525/317; 525/902; 526/318.25; 526/344
[58] Field of Search ..................................... 525/317, 301, 525/902; 521/65, 70, 64, 51, 73, 75, 134, 138, 149; 523/201; 524/804, 832, 834, 845; 526/318.25, 344

[56] References Cited

U.S. PATENT DOCUMENTS

| | | |
|---|---|---|
| 3,290,265 | 12/1966 | Kaneko . |
| 3,504,053 | 3/1970 | Williams . |
| 3,760,036 | 9/1973 | Kelly . |
| 3,903,198 | 9/1975 | Wei . |
| 4,245,070 | 1/1981 | Kemp ...................................... 525/317 |
| 4,868,258 | 9/1989 | Brulet . |

FOREIGN PATENT DOCUMENTS 2 344 579   10/1977   France .

*Primary Examiner*—John M. Cooney, Jr.
*Attorney, Agent, or Firm*—Millen, White, Zelano, & Branigan, P.C.

[57] ABSTRACT

The present invention relates to vinyl chloride copolymers, in the latex form, the particles of which are composed of a core, of an outer layer and optionally of an intermediate layer. It also relates to the process for the manufacture of this latex by seeded miscosuspension polymerization and to its applications in paints and plastisols.

24 Claims, No Drawings

LATEX BASED ON VINYL CHLORIDE COPOLYMERS WITH A SPECIFIC STRUCTURE, PROCESS FOR THE MANUFACTURE THEREOF AND APPLICATIONS THEREOF

CROSS-REFERENCE TO RELATED APPLICATION

This application is related to Applicants' co-pending application Ser. No. 08/866,051 filed May 30, 1997, based on French application No. 96/06734 filed May 31, 1996, and assigned to the same Assignee as the present application.

FIELD OF THE INVENTION

The present invention relates to vinyl chloride copolymers, having a structure composed of a core, of an outer layer and optionally of an intermediate layer, in the latex form and to a process for the preparation thereof by seeded microsuspension polymerization. Another subject of the invention is the use of these copolymers and of their latex.

BACKGROUND OF THE INVENTION

Vinyl polymers having a core-shell structure and capable of being used in paint formulations are known. The particles of these polymers are composed of a core and of a shell with a different composition from that of the core. The latex based on these particles is generally obtained by emulsion polymerization. Thus, a description is given in the document WO 95/14063 of an aqueous dispersion of particles composed of a copolymer core obtained by the emulsion polymerization of ethylene and of a vinyl monomer and of a copolymer shell comprising the units of an alkyl (meth)acrylate having a carbon number of between 4 and 12 and of at least one monomer chosen from alkyl (meth)acrylates having a carbon number of between 1 and 3, styrene and α-methylstyrene.

The document WO 94/20556 discloses a dispersion of particles composed of a polymer core containing one or a number of monomer(s) chosen from vinyl esters, (meth) acrylates, vinyl chloride, aromatic vinyl compounds and ethylene and of a copolymer shell containing units of (meth)acrylates of specific solubility, of a functionalized olefinic monomer and of a hydrolysable unsaturated silane. The core represents 75 to 98% of the total weight of the particle.

Moreover, the document JP-A-3-41103 discloses a method for producing copolymers suitable for the manufacture of plastisols which are stable on storage. Example 5 of this document describes a microsuspension polymerization process, according to which part of the vinyl chloride to be used is introduced before the reaction and the remaining part of the vinyl chloride and the butyl methacrylate are introduced continuously, all the methacrylate being introduced before the degree of conversion of the monomers exceeds 60%. This method exhibits disadvantages illustrated by Comparative Examples 4 and 5. Indeed, it is impossible to obtain stable plastisols with vinyl acetate and when the butyl acrylate is introduced beyond a degree of conversion of the monomers of 60%.

SUMMARY OF THE INVENTION

The discovery has now been made of vinyl chloride copolymers, in the latex form, the particles of which have a structure composed of a core coated with one or with two layer(s). These particles are characterized in that they comprise a core of polymers based on vinyl chloride and a first layer of polymers comprising at least one monomer chosen from the group A and optionally a second layer of polymers based on vinyl chloride. The group A is formed from alkyl methacrylates and acrylates, the alkyl group having a carbon number of between 1 and 8, and from vinyl esters of mono- and polycarboxylic acids. The polymers of the first layer can be crosslinked or grafted.

Polymers based on vinyl chloride is understood to mean homo- and copolymers, the latter containing at least 50% by weight of vinyl chloride and at least one monomer which is capable of copolymerizing with vinyl chloride. The copolymerizable monomers are those generally employed in conventional techniques for copolymerization of vinyl chloride. Mention may be made of vinyl esters of mono- and polycarboxylic acids, such as vinyl acetate, propionate or benzoate; unsaturated mono- and polycarboxylic acids, such as acrylic, methacrylic, maleic, fumaric or itaconic acid, as well as their aliphatic, cycloaliphatic or aromatic esters, their amides or their nitrites; alkyl, vinyl or vinylidene halides; alkyl vinyl ethers and olefins.

The preferred copolymerizable monomers are vinyl esters, alkyl (meth)acrylates and vinylidene halides.

Homopolymers are advantageously chosen as polymers based on vinyl chloride.

The following are advantageously chosen from the group A: methyl, ethyl, propyl and butyl acrylate, methyl, ethyl, propyl and butyl methacrylate and vinyl acetate, propionate and benzoate. Methyl acrylate and butyl acrylate are particularly preferred.

According to the invention, the copolymer latex where the particles of the copolymers are composed of a core and only of one layer coating the core has the property of resulting in a film after drying at room temperature or at a temperature less than or greater than room temperature.

Copolymers where the particles of the copolymers are composed of a core, of an outer layer and of an intermediate layer can be used as impact-resistant additives or transformation additives, such as processing aid. They can also be used in plastisol applications and thus make it possible to obtain fluid plastisols having specific properties, such as the decrease in the gelling temperature, the decrease in the amount of plasticizer and the production of foams of good cellular quality at temperatures varying within very wide limits.

Another subject of the present invention is a process for the preparation of copolymers described above, in the latex form, by microsuspension polymerization.

Microsuspension, or fine suspension, polymerization is understood to mean a polymerization, in the presence of organosoluble initiators, of at least one monomer dispersed by intense mechanical action in an aqueous medium containing an emulsifier as stabilizer, in order to obtain a dispersion of particles where the mean diameter of the particles is less than 5 microns.

The process according to the invention is characterized in that:

(a) at least one monomer chosen from the group A is reacted, optionally with a crosslinking or grafting agent, in the presence of a seeding polymer P based on vinyl chloride prepared beforehand by microsuspension polymerization and containing at least one organosoluble initiator, and that optionally (b) vinyl chloride is subsequently introduced, optionally with a copolymerizable monomer, in order to overpolymerize the copolymer obtained in the stage (a)

The seeding polymer P1 necessary for the copolymerization can be prepared according to conventional microsuspension polymerization techniques. For example, water, vinyl chloride, alone or in combination with one or a number of copolymerizable monomer(s), an anionic emulsifier and an organosoluble initiator are employed. The monomer(s) are finely dispersed in water using high energy mechanical means, such as a colloid mill, a high speed pump, a vibratory agitator of an ultrasonic device. The microsuspension obtained is then heated under autogenous pressure and with moderate stirring at a temperature determined according to the molecular weight of the product which it is desired to obtain.

The seeding polymer P1 is used in the form of an aqueous dispersion of its particles where the mean diameter of the particles is generally between 0.05 and 3 $\mu$m and preferably between 0.2 and 1.0 $\mu$m.

In order to enable the process of the invention to be carried out, the particles of the seeding polymer P1 must contain a sufficient amount of organosoluble initiator, preferably of between 1 and 3% by weight with respect to the seeding polymer.

The organosoluble initiators are generally organic peroxides, such as lauroyl, decanoyl and caproyl peroxides, tert-butyl perpivalates and tert-butyl peroctoates.

The choice of the organosoluble initiator depends on its rate of decomposition at the reaction temperature adopted. Indeed, the said initiator must be sufficiently reactive in order for normal doses, of the order of 0.1 to 3% by weight with respect to the monomer or to the mixture of monomers, to make it possible to prepare the seeding polymer within times of between 4 and 20 hours. However, the rate of decomposition of the initiator must not be excessively high, so that the amount of initiator decomposed in the preparation of the seeding polymer does not exceed half the amount of initiator employed. For this, it is therefore necessary to choose an initiator with a half-life such that the proportion of initiator destroyed during the preparation of the seeding polymer is between 5 and 50%. by weight of all the initiator employed.

Lauroyl peroxides are advantageously chosen.

In the case where a number of organosoluble initiators are employed, it is advantageous to choose them with different reactivities; the most reactive initiators act mainly during the preparation of the seeding polymer, whereas the least reactive initiators act in particular during the seeded polymerization of the monomer or of the mixture of monomers.

According to the present invention, the polymerization can be carried out in the presence of a second seeding polymer P2. The latter is either present simultaneously with P1 for the implementation of the stage (a) or introduced after the stage (a) for the implementation of the stage (b).

The second seeding polymer P2 is used in the form of an aqueous dispersion of its particles where the mean diameter of the particles is between 0.05 and 1.5 $\mu$m, preferably between 0.05 and 0.8 $\mu$m, which particles can contain an initiator.

This dispersion of particles can be obtained by conventional microsuspension or emulsion polymerization techniques.

When the preparation of the second seeding polymer is carried out by microsuspension polymerization, it is carried out as described above but homogenization is more developed if the particles to be obtained are very small in size.

The second seeding polymer P2 is advantageously prepared by emulsion polymerization, which consists in making use of water, vinyl chloride, alone or in combination with one or a number of copolymerizable monomer(s), a water-soluble initiator and an anionic emulsifier, optionally in combination with a non-ionic emulsifier.

The size of the particles is adjusted according to the usual methods specific to emulsion polymerization, such as judicious choice of the nature and of the amount of emulsifier used, employment of seeds and modification of the rate of stirring.

The reaction mixture is heated under autogenous pressure and moderate stirring at a temperature of between 30° and 80° C. After the fall in pressure, the reaction is halted and the unconverted monomer or monomers are degassed.

The water-soluble initiators necessary for the preparation of the second seeding polymer P2 are generally represented by hydrogen peroxide or alkali metal or ammonium persulphates, optionally in combination with water-soluble reducing agents, such as alkali metal sulphites or bisulphites. The highly variable amounts used depend on the initiator system chosen and are just sufficient to provide for the polymerization within times of between 4 and 10 hours.

In the process according to the invention, the amount of the seeding polymer P1 to be employed with respect to the weight of the monomer(s) charged to the stage (a) is generally between 0.02 and 10. When two seeding polymers are used, the proportion by mass of the first P1 with respect to the second P2 is between 95/5 and 5/95.

In order to improve the stability of the microsuspension, it can be advantageous to add, before and/or after and/or during polymerization, at least one anionic emulsifier, optionally in combination with at least one non-ionic emulsifier. The anionic emulsifiers are preferably represented by alkaline alkyl phosphates, alkyl sulphosuccinates, allylsulphonates, vinylsulphonates, alkylaryl sulphonates, alkylsulphonates, ethoxylated alkyl sulphates, alkyl sulphates or fatty acid soaps and the non-ionic emulsifiers by polycondensates of ethylene or propylene oxide with various hydroxylated organic compounds. This emulsifier can be the same as that or those used in the preparation of the seeding polymer. Alkali metal dodecylbenzene sulphonate and/or dodecyl sulphate is/are preferably chosen.

The amounts of emulsifier can represent up to 3% by weight of the monomer(s).

The polymerization temperature is generally between 30° and 80° C.

Methyl, ethyl, propyl and butyl acrylate, methyl, ethyl, propyl and butyl methacryate and vinyl acetate, propionate and benzoate are preferably chosen from the compounds of the group A. Methyl acrylate and butyl acrylate are advantageously chosen.

The total amount of compound(s) of the group A introduced with respect to the total weight of the seeding polymer(s) and of the monomer(s) charged to the stage (b) is generally between 0.01 and 1.

The stage (b) according to the invention can be implemented in the presence of one or of a number of water-soluble initiator(s), such as those described above. Use is preferably made of an alkali metal or ammonium persulphate.

Any monomer comprising at least two reactive double bonds can be used as crosslinking or grafting agent. Mention may be made, by way of example, of allyl methacrylate, diallyl phthalate or divinylbenzene.

The rate of polymerization according to the invention can be accelerated by activating the initiator enclosed within the particles of the seeding polymer(s) by an organosoluble metal complex formed throughout the polymerization by reaction between a water-soluble metal salt and a complexing agent introduced gradually, as described in French Patent 2,234,321. The amount of metal salt employed is such that the metal salt/initiator molar ratio is between 0.001 and 0.10 and preferably between 0.001 and 0.03.

Mention may be made, among metal salts, of those of iron, copper, cobalt, nickel, zinc, tin, titanium, vanadium, manganese, chromium and silver. Copper salts are particularly preferred.

The complexing agent is generally chosen from mono- or polycarboxylic acids, alkyl phosphoric acids, lactones, ketones and carbazones and is used in an amount such that the complexing agent/metal salt molar ratio is between 1 and 110 and preferably between 5 and 20.

Ascorbic acid is advantageously chosen as complexing agent.

The amount of water necessary for the polymerization according to the invention is such that the initial concentration of seeding polymer(s), plus the monomer or monomers charged, is between 20 and 80% and preferably between 45 and 75% by weight with respect to the reaction mixture.

The duration of polymerization is generally between 30 minutes and 10 hours, preferably between 1 and 7 hours.

The latices thus prepared contain one or two population(s) of polymer particles. In the case of monopopulated latices, the mean diameters of the particles are generally between 0.4 and 2.5 $\mu$m. Bipopulated latices contain particles exhibiting different mean diameters, one between 0.4 and 2.5 $\mu$m and the other between 0.08 and 1 $\mu$m, in a ratio of the diameters of between 1 and 20 and preferably of between 4 and 8 and a ratio by weight of between 0.1 and 10 and preferably of between 2 and 5.

Latices containing two populations of particles can also be obtained by mixing monopopulated latices, obtained according to the invention, with aqueous dispersions of particles of seeding polymer P1 or P2, preferably P2, in a ratio of the diameters of between 1 and 20 and preferably of between 4 and 8 and a ratio by weight of between 0.1 and 10 and preferably of between 2 and 5.

The mono- and bipopulated latices according to the invention are very particularly suitable in coating applications, such as plasticizer-free plastisols and paints, because they readily result in a film after drying.

The vinyl chloride copolymers prepared according to the invention are separated from the polymerization mixture by any known process, such as filtration, coagulation-draining, flaking, centrifugal decantation and spraying. The copolymers are preferably obtained by spraying the latices.

The copolymers thus obtained, which are provided in the form of powders particularly suitable for the preparation of plastisols, have a lower gelling temperature. Moreover, they result in foams of high cellular quality within very wide temperature limits. These copolymers can also be used as impact-resistant additives and as processing aid.

The invention will be better understood with the help of the following examples.

EXPERIMENTAL PART

In the following, except when otherwise indicated, the aqueous ascorbic acid solution used contains 0.7 g of ascorbic acid per 1 liter of water and the copper sulphate is $CuSO_4 \cdot 5H_2O$.

(A) Preparation of the Seeding Polymer P1

The following are successively introduced into an 800 liter reactor stirred at 35 revolutions/min and adjusted to 15° C.:

375 kg of water 5 l of the buffer solution containing 426 g of potassium dihydrogenphosphate and 117 g of pure sodium hydroxide 11 g of benzoquinone powder 6 kg of lauroyl peroxide 320 kg of vinyl chloride 48 kg of a 10% by weight aqueous solution of sodium dodecylbenzene sulphonate, the reactor being placed under vacuum just before the introduction of the vinyl chloride.

A fine dispersion of the vinyl chloride in the aqueous mixture is then produced, at a temperature of less than or equal to 35° C., by stirring the said mixture for 105 minutes at 5,500 revolutions/min.

The reaction mixture is then brought to the targeted polymerization temperature of 45° C. under autogenous pressure, the rate of stirring being 30 revolutions/min. During the polymerization, benzoquinone is introduced continuously with a constant throughput of 10.5 g/h.

After the fall in pressure to a value of 3.5 bars, that is to say after 8 hours, the unreacted vinyl chloride is degassed. A latex is thus obtained where the particles of the latex have a mean diameter of approximately 0.55 $\mu$m and contain approximately 2% by weight of lauroyl peroxide with respect to the polymer.

(B) Preparation of the Seeding Polymer P2

(B.1) The following are introduced into an 800 liter reactor equipped with a stirrer:

415 kg of water 1.25 kg of lauric acid and 0.8 kg of pure sodium hydroxide.

The mixture is then brought to a temperature of 65° C. and is maintained at this temperature for an hour. The mixture is then cooled to 55° C. and then the reactor is placed under vacuum. While maintaining the temperature of the mixture at 55° C., 400 kg of vinyl chloride and 4 liters of an aqueous solution containing 109 g of ammonium persulphate are then introduced, followed by the continuous addition, with a constant throughput of 3 l/h, of an aqueous solution containing, in 30 liters of water, 0.72 g of copper sulphate, 18 g of potassium metabisulphite and 0.54 liter of 12N aqueous ammonia. Three hours after the introduction of the persulphate, an aqueous solution containing 4.56 kg of sodium dodecylbenzene sulphonate per 40 liters of water is added continuously to the reaction mixture for 5 hours at 8 l/h. When the internal pressure is 4.5 bars, the reaction is halted by rapid cooling and an aqueous sodium dodecylbenzene sulphonate solution containing 7.28 kg on a dry basis is then introduced. The polymer particles obtained have a mean diameter in the region of 0.11 $\mu$m.

(B.2) The following are introduced into a 28 liter reactor equipped with a stirrer:

9650 g of water 100 cm$^3$ of an aqueous solution containing 0.975 g of ethylenediaminetetraacetic acid (EDTA)

0.191 g of iron sulphate 1.78 g of sodium sulphosuccinamate 9.8 g of lauric acid and 3.25 g of pure sodium hydroxide.

The reactor is then placed under vacuum before the introduction of 7000 g of vinyl chloride. The reaction mixture is then brought to the targeted temperature of 58° C. As soon as the mixture reaches 45° C., an aqueous solution containing 3.5 g of potassium persulphate per 1 liter of water is introduced continuously. One hour after the beginning of introduction of the latter, one liter of solution containing 56 g of sodium dodecylbenzene sulphonate is added continuously at a constant throughput for 4 hours.

When the internal pressure is 4 bars, the reactor is reexposed to the air and then cooled. After polymerizing for 4 hours and 30 minutes, the concentration by weight of polymer is 41% and the degree of conversion of the vinyl chloride is 93%. The mean diameter of the polymer particles is 0.2 µm.

(C) EXAMPLES

Example 1 to 4

The following are mixed:

0.14 g of potassium dihydrogenphosphate 5.3 mg of copper sulphate 140 g, on a dry basis, of the seeding polymer P1 latex and 810 g of demineralized water.

The aqueous mixture is then introduced, at room temperature, into a 2 liter autoclave equipped with a stirrer; vacuum is then applied while stirring the mixture. After stirring for 15 minutes, 140 g of butyl acrylate are introduced and the mixture is then heated to 58° C. and this temperature is maintained throughout the duration of the reaction.

As soon as the mixture reaches 53° C., the continuous introduction of the aqueous ascorbic acid solution is begun, so as to introduce 0.03 g of ascorbic acid in total.

The heating is halted after polymerizing for 100 minutes, 2 hours, 4 hours and 5 hours.

A copolymer dispersion is obtained, the concentration by weight and the total degree of conversion of butyl acrylate of which are reported in Table 1. The mean diameter of the particles is 0.59 µm, whatever the duration of polymerization.

TABLE 1

| Example | Duration (h) | Concentration (%) | Degree of conversion (%) |
| --- | --- | --- | --- |
| 1 | 1 h 40 | 22.4 | 99 |
| 2 | 2 | 18.7 | 99 |
| 3 | 4 | 18.2 | 99 |
| 4 | 5 | 19.8 | 99 |

Example 5

The reaction is carried out as described in Example 2, except that 196 g of butyl acrylate are introduced.

The concentration of copolymer in the aqueous mixture is 18.4% and the degree of conversion of the butyl acrylate is 99%. The mean diameter of the copolymer particles is 0.65 µm.

Example 6

The reaction is carried out as described in Example 1, except that methyl acrylate is used instead of butyl acrylate and that the duration of the reaction is 80 minutes. The degree of conversion of the methyl acrylate at the end of the reaction is 98% and the concentration of the copolymer in the aqueous mixture is 19.7%. The mean diameter of the particles of the copolymer is 0.59 µm.

Example 7

The reaction is carried out as described in Example 1, except that, after reacting for one hour, 650 g of vinyl chloride and, continuously, 19.7 g of a 26.3%, on a dry basis, aqueous sodium dodecyl sulphate solution and the aqueous ascorbic acid solution are introduced.

At the end of 4 h and 30 minutes after the addition of the vinyl chloride, the heating is halted and the autoclave is cooled. The concentration of the copolymer present in the aqueous mixture is 37%, The degree of conversion of the vinyl chloride is 95% and the mean diameter of the copolymer particles is 1.15 µm.

Example 8

The reaction is carried out as described in Example 7, except that methyl acrylate is used instead of butyl acrylate. At the end of 5.5 hours of reaction from the introduction of the vinyl chloride, the heating is halted and the reactor is cooled. The concentration of the copolymer present in the aqueous mixture is 35% and the degree of conversion of the vinyl chloride is 96%. The mean diameter of the particles of the copolymer is 1.14 µm.

Example 9

The following are successively introduced, by suction, into a 28 liter reactor equipped with a stirrer and placed under vacuum beforehand:

7500 g of demineralized water 1.5 g of potassium dihydrogenphosphate 56 mg of copper sulphate 1000 g, on a dry basis, of the seeding polymer P1 latex and 2100 g of demineralized water.

The reactor, at room temperature, with stirring and containing the aqueous mixture, is again placed under vacuum. 1400 g of butyl acrylate are then introduced and the mixture is then heated to 58° C. During the rise in temperature, the reactor is placed under a pressure of one bar using nitrogen. As soon as the mixture reaches 54° C., the introduction is carried out continuously of approximately 120 ml of the aqueous ascorbic acid solution in the first 30 minutes and then in a variable amount depending on the exothermicity of the reaction. At the end of 105 minutes after the beginning of the introduction of the aqueous ascorbic acid solution, the heating is halted and the reactor is rapidly cooled. When the temperature has fallen to 50° C., the reactor is placed under atmospheric pressure.

The concentration of the copolymer in the aqueous mixture is 20% by weight and the degree of conversion of the butyl acrylate is 85%.

Example 10

The reaction is carried out as in Example 9, except that, at the end of one hour after the beginning of the introduction of the ascorbic acid, the heating is halted and then 6000 g of vinyl chloride are introduced.

The reactor is again heated and, as soon as the mixture reaches 53° C., the aqueous ascorbic acid solution is introduced continuously, followed one hour later by an aqueous solution containing 53 g of sodium dodecyl sulphate and 144 mg of sodium hydroxide per one lire of water. This solution is introduced over 4 hours with a constant throughput, such that the total volume introduced is one liter.

When the fall in pressure of the reaction mixture is 4 bars, the introduction of the ascorbic acid is halted and the heating is halted and the reactor is rapidly cooled.

The concentration of the copolymer in the aqueous mixture is 30%, the degree of conversion of the vinyl chloride is 84% and the mean diameter of the particles is 1.15 µm.

Example 11

The reaction is carried out identically to Example 10, except that, instead of sodium dodecyl sulphate, sodium dodecylbenzene sulphonate is used.

The concentration of the copolymer in the aqueous mixture is 35% by weight and the degree of conversion of the vinyl chloride is 84%. The mean diameter of the particles of the copolymer is 1.22 µm.

Comparative Example 12

The following are mixed:
0.14 g of potassium dihydrogenphosphate
5.3 mg of copper sulphate
46 g, on a dry basis, of the latex of the seeding product P1
1000 g of demineralized water.

The aqueous mixture is then introduced at room temperature into a 2 liter autoclave equipped with a stirrer and then vacuum is applied while stirring the mixture.

700 g of vinyl chloride are introduced into the reactor and the mixture is then heated to 58° C. under autogenous pressure.

As soon as the aqueous mixture reaches 53° C., the aqueous ascorbic acid solution is introduced continuously at a constant throughput and over 5 hours, so that the total amount of ascorbic acid amounts to 0.03 g. After the first hour of introduction of ascorbic acid, a 133 g/liter aqueous sodium dodecyl sulphate solution is introduced continuously and at a constant throughput over 4 hours.

The throughput is such that the total amount of sodium dodecyl sulphate introduced is equal to 5.6 g.

As soon as the fall in the pressure of the reaction mixture is 4 bars, the heating is halted and the reactor is rapidly cooled.

A latex is thus obtained which has a polymer concentration of 42% by weight. The degree of conversion of the vinyl chloride is 92% and the mean diameter is 1.19 µm.

Comparative Example 13

The reaction is carried out identically to Example 12, except that sodium dodecylbenzene sulphonate is used instead of sodium dodecyl sulphate.

At the end of the operation, the latex has a polymer concentration of 41% by weight and the mean diameter of the particles of the polymer is 1.16µ. The degree of conversion of the vinyl chloride is 83%.

Example 14

The reaction is carried out as described in Example 7, except that 196 g of butyl acrylate are used. The concentration of copolymer in the aqueous mixture is 34.1% by weight and the degree of conversion of the vinyl chloride is 92%. The mean diameter of the copolymer particles is 1.24 µm.

Example 15

The reaction is carried out as in Example 7, except that an aqueous sodium dodecylbenzene sulphonate solution is used instead of sodium dodecyl sulphate.

At the end of the reaction, a latex is obtained with a concentration of copolymer of 35% and in which the mean diameter of the copolymer particles is 1.24µ. The degree of conversion of the vinyl chloride is 92%.

Preparation of Plastisols 100 parts of the resins obtained after spraying the latices prepared in Examples 8 and 13 to 16 are mixed with 45 parts of dioctyl phthalate.

The characteristics of the resulting plastisols are reported in Table II. The rheometer used is of the Brookfield type and the measurements were carried out at 25° C. after 30 minutes and 24 hours. The plastisols based on copolymers according to the invention are less yellow than the vinyl chloride homopolymers (YI is the yellowing index and R is the ratio of the YI values with respect to the homopolymer).

TABLE 2

| Examples | Gelling temperature (°C.) | Brookfield viscosity, 1/2 h, in poises | Brookfield viscosity after 24 h (poises) | YI yellowing | R YI ratio |
|---|---|---|---|---|---|
| 12 | 114 | 385 | 1450 | 32.5 | 1 |
| 7 | 110 | 365 | 1480 | 29.2 | 0.9 |
| 14 | 104 | 380 | 1610 | 22.5 | 0.69 |
| 13 | 115 | 280 | 1140 | 31.1 | 1 |
| 15 | 105 | 210 | 1400 | 21.7 | 0.7 |

Preparation of the Films

The latices prepared from Examples 1 to 6 and 9 are poured into molds and then left at room temperature. After evaporating the water, films are obtained which exhibit elastomer characteristics.

Example 16

The following are introduced successively, by suction, into a 28 liter reactor equipped with a stirrer and placed under vacuum beforehand:
7200 g of demineralized water
1.2 g of potassium dihydrogenphosphate
4.5 mg of copper sulphate
222 g, on a dry basis, of the seeding polymer P1 latex.

The rate of stirring is then 80 revolutions/min and the aqueous mixture is at room temperature. 311 g of butyl acrylate are then introduced and then the reactor is placed under a pressure of one bar using nitrogen. The reaction mixture is then brought over 30 minutes to the targeted temperature of 58° C.

As soon as the temperature of the mixture reaches 53° C., the introduction is carried out of 50 ml of ascorbic acid over 15 minutes and then continuously in a variable amount depending on the exothermicity of the reaction. At the end of 45 minutes after the beginning of the introduction of the ascorbic acid, the heating is halted and the reactor is cooled. When the temperature has fallen to 35° C., the reactor is placed under vacuum. 216 g, on a dry basis, of the seeding polymer P2 latex prepared according to (B.1) are then introduced. The reactor is again placed under vacuum before introducing 6000 g of vinyl chloride. The reaction mixture is then brought over 30 minutes to the targeted temperature of 58° C. As soon as the temperature of the mixture reaches 53° C., the aqueous solution of the ascorbic acid is introduced continuously, i.e. 120 ml during the first 30 minutes followed by a variable throughput depending on the exothermicity of the reaction.

One hour after the beginning of the introduction of the ascorbic acid, one liter of the aqueous solution containing 4.8 g of sodium dodecyl sulphate and 144 mg of pure sodium hydroxide is introduced at a constant throughput for 4 hours.

When the fall in pressure of the mixture is 4 bars, the heating and the introduction of the ascorbic acid are halted and the rate of stirring is reduced. The unreacted vinyl chloride is removed by degassing. A latex is obtained in which the concentration of copolymers is 35%. The degree of conversion of the vinyl chloride is 86%.

Particle size analysis shows that the copolymer is formed from two populations, the particles of which have mean diameters of 0.13 μm and 1.04 μm respectively. The fine particles represent 9% by weight of the copolymer.

Example 17

The reaction is carried out as described in Example 16, except that the seeding polymer P2 latex is introduced with that of P1. The degree of conversion of the vinyl chloride is 96% and the latex obtained has a concentration of polymers of 34% by weight.

The particle size analysis shows that the copolymer is formed from 2 populations, the particles of which have mean diameters of 0.15 μm and 1.05 μm respectively. The fine particles represent 16% by weight of the copolymer.

Example 18

The reaction is carried out as described in Example 17, except that 0.15 g of sodium persulphate is introduced at the same time as the introduction of the vinyl chloride.

Example 19

The reaction is carried out as described in Example 18, except that 0.5 g of sodium persulphate is introduced.

Example 20

The reaction is carried out as described in Example 19, except that 300 g of butyl acrylate, 9825 g of water, 7500 g of vinyl chloride, 278 g, on a dry basis, of the polymer P2 latex and 270 g of that of P1, 1.5 g of potassium dihydrogenphosphate, 56 mg of copper sulphate, 60 g of sodium dodecylbenzene sulphonate and 180 mg of sodium hydroxide are introduced.

Example 21

The reaction is carried out as described in Example 20, except that 322 g of methyl acrylate are introduced instead of butyl acrylate.

Example 22

The reaction is carried out as described in Example 21, except that 0.15 g of sodium persulphate is introduced.

Comparative Example 23

The reaction is carried out as described in Example 17, except that the reaction is carried out In the absence of monomer of the group A.

The characteristics of the latices prepared according to Examples 18 to 23 are reported in Table III.

TABLE 3

| Example | Concentration of copolymers (% by weight) | Degree of conversion of the vinyl chloride (%) | Mean diameters of 2 populations | | % by weight of fine particles |
| --- | --- | --- | --- | --- | --- |
| 18 | 37 | 83 | 0.15 | 1.04 | 21 |
| 19 | 39 | 87 | 0.19 | 1.14 | 19 |
| 20 | 43 | 88 | 0.18 | 1.14 | 21 |
| 21 | 43 | 88 | 0.19 | 1.10 | 26 |
| 22 | 42 | 87 | 0.20 | 1.16 | 23 |
| 23 | 34 | 75 | 0.20 | 1.16 | 25 |

Preparation of the Plastisols

The latex from Examples 19 and 21 to 23 is then sprayed and then the powder obtained is milled. The plastisol is prepared by mixing 100 parts by weight of the milled copolymer with 100 parts by weight of dioctyl phthalate.

240 g, on a dry basis, of the latex of Example 11 are mixed with 60 g, on a dry basis, of the P2 latex prepared according to (B.2), the mean diameter of the particles of which is 0.2 μm, and then the mixture is sprayed. The powder obtained is then milled and then mixed with dioctyl phthalate in the same proportions as the powder obtained from the latex of Example 19.

The gelling temperature for each plastisol is reported in Table IV and their rheological properties are measured using a rotational rheometer of Brookfield RTV type at 25° C. and after 30 minutes.

TABLE 4

| Example | Gelling temperature (°C.) | Brookfield viscosity (poises) |
| --- | --- | --- |
| 19 | 80 | 85 |
| 21 | 72 | 87 |
| 22 | 70 | 88 |
| 23 | 95 | 90 |
| 24 | 80 | 85 | n = Example 24 denotes the latex resulting from the mixture of latex of Example 11 and of that of the polymer P2 prepared according to (B.2)

Preparation of Foams 100 parts of the powder obtained after spraying the latex from Examples 19 and 21 to 24 are mixed with 65 parts of dioctyl phthalate, 2.5 parts of azodicarbonamide and 2 parts of an activator. The resulting mixture is first coated and then placed in an oven at 195° C. for 150 seconds. The foams thus prepared exhibit very good cellular quality (very fine cells).

The mixture obtained from the latex of Examples 19 and 24 moreover makes it possible to obtain foams of good cellular quality at temperatures of less than 195° C. and generally from 130° C.

In the preceding text where the term "spraying" is used as a technique to separate powder from the latex, the term is generally meant to describe a conventional spray drying operation.

The preceding examples can be repeated with similar success by substituting generically or specifically described reactants and/or operating conditions of this invention for those used in the preceding examples.

The entire disclosure of all applications, patents and publications, cited above, and of corresponding French application No. 96/06.733, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. A process for the preparation of a copolymer latex by microsuspension polymerization, characterized in that
   (a) at least one monomer chosen from group A, consisting of alkyl methacrylates and acrylates, the alkyl group having a carbon number of between 1 and 8, and from vinyl esters of mono- and polycarboxylic acids, is reacted, optionally with a crosslinking or grafting agent, in the presence of a seeding polymer P1 based on vinyl chloride prepared beforehand by microsuspension polymerization and containing at least one organosoluble initiator so as to form a copolymer, said copolymer consisting essentially of said seeding polymer P1, as a core, coated with a layer consisting essentially of polymeric units of substantially only the group A monomer, and that optionally (b) vinyl chloride is subsequently introduced, optionally with a copolymerizable monomer, in order to overpolymerize the copolymer layer obtained in the stage (a) with a second layer consisting essentially of a polymer of vinyl chloride.

2. A process according to claim 1, wherein the stage (a) is implemented in the presence of a second seeding polymer P2.

3. A process according to claim 1, comprising conducting the overpolymerization of the stage (b).

4. A process according to claim 3, wherein the stage (b) is implemented in the presence of a second seeding polymer P2.

5. A process according to claim 2, wherein the seeding polymer P2 is prepared by emulsion polymerization.

6. A process according to claim 5, wherein the mean diameter of the particles of the polymer P2 is less than that of the particles of P1.

7. A process according to claim 1, comprising conducting the overpolymerization of the stage (b) and conducting said overpolymerization in the presence of a water-soluble initiator.

8. A process according to claim 7, wherein the water-soluble initiator is an alkali metal or ammonium persulphate.

9. A process according to claim 1 wherein an emulsifying agent is added before and/or after and/or during polymerization.

10. A process according to claim 1 wherein the rate of polymerization is accelerated by activation of the initiator enclosed within the particles of the seeding polymer or polymers.

11. A process according to claim 1, wherein the monomer of the group A is butyl acrylate or methyl acrylate.

12. A latex based on vinyl chloride copolymers, the particles of which are composed of a core of polymer based on vinyl chloride and of a layer of polymer consisting essentially of polymer units of only at least one monomer of the group A, formed from alkyl methacrylates and acrylates, the alkyl group having a carbon number of between 1 and 8, and from vinyl esters of mono- and polycarboxylic acids, and optionally a crosslinking or grafting agent, as produced by the process of claim 1.

13. A latex according to claim 12, characterized in that the particles are coated with a second layer of polymer based on vinyl chloride.

14. A film obtained by drying the latex produced by the process according to claim 1.

15. Vinyl chloride copolymers obtained by drying the latex produced by the process according to claim 1.

16. Plastisols produced from the copolymers according to claim 15.

17. Impact-resistant additives comprising copolymers according to claim 15.

18. Foams produced from copolymers according to claim 15.

19. Foams produced from plastisols according to claim 16.

20. Overpolymerized vinyl copolymers produced by the process of claim 3.

21. A latex as produced by the process of claim 11.

22. A film according to claim 14, wherein the monomer of group A is butyl acrylate or methyl acrylate.

23. Plastisols according to claim 16, wherein the group A monomer is butyl acrylate or methyl acrylate.

24. A foam according to claim 18, wherein monomer A is butyl acrylate or methyl acrylate.

* * * * *